(12) United States Patent
Berrak

(10) Patent No.: US 9,194,049 B2
(45) Date of Patent: Nov. 24, 2015

(54) METHOD FOR SIMULTANEOUS ELIMINATION OF ORTHOPHOSPHATE AND AMMONIUM USING ELECTROLYTIC PROCESS

(75) Inventor: Abderrazak Berrak, Sherbrooke (CA)

(73) Assignee: E2Metrix Inc., Sherbrooke, Quebec (CA)

( * ) Notice: Subject to any disclaimer, the term of this patent is extended or adjusted under 35 U.S.C. 154(b) by 415 days.

(21) Appl. No.: 13/555,359

(22) Filed: Jul. 23, 2012

(65) Prior Publication Data

US 2014/0021057 A1   Jan. 23, 2014

(51) Int. Cl.
| | |
|---|---|
| C25B 1/00 | (2006.01) |
| C02F 9/00 | (2006.01) |
| C25C 7/00 | (2006.01) |
| C25B 1/18 | (2006.01) |
| C25B 9/00 | (2006.01) |

(52) U.S. Cl.
CPC .... *C25B 1/18* (2013.01); *C25B 9/00* (2013.01)

(58) Field of Classification Search
USPC .................................. 205/346, 334, 488, 490
See application file for complete search history.

(56) References Cited

U.S. PATENT DOCUMENTS

| | | | |
|---|---|---|---|
| 4,389,317 A | 6/1983 | Trentelman et al. | |
| 2009/0013742 A1* | 1/2009 | Zhang et al. | 71/12 |
| 2010/0184198 A1* | 7/2010 | Joseph et al. | 435/266 |
| 2011/0302909 A1* | 12/2011 | Botte | 60/274 |

FOREIGN PATENT DOCUMENTS

| | | |
|---|---|---|
| WO | WO95/05347 | 2/1995 |
| WO | WO00/56139 | 9/2000 |
| WO | WO01/19735 | 3/2001 |
| WO | WO2007/009749 | 1/2007 |
| WO | WO2009/102142 | 8/2009 |

OTHER PUBLICATIONS

Hug et al.; "Struvite Precipitation from Urine with Electrochemical Magnesium Dosage"; pp. 289-299.*
Mounir Bennajah, Theses presented on Dec. 7, 2007 at the Institut National Polytechnique De Toulouse.
Frederic Cabanes, Theses presented on Jan. 16, 2006 at the Institut National Polytechnique De Toulouse.
Holt et al., A quantitative comparison between chemical dosing and electocoagulation, Colloids and Surfaces A: Physicochem. Eng. Aspects 211 (2002) 233-248.

(Continued)

*Primary Examiner* — Zulmariam Mendez
(74) *Attorney, Agent, or Firm* — Damien Calvet; Brouillette & Partners

(57) ABSTRACT

The present invention provides a method for the treatment of nitrogen-rich effluent and production of struvite comprising introducing the effluent in an electrolytic system and performing a first electrolytic treatment to the effluent in a first electrolytic reactor in order to organic matter that impact on nucleation of struvite, followed by a second electrolytic treatment in a second electrolytic reactor, thereby injecting Mg ions which react with $NH_4^+$ and orthophosphates from the effluent to form a struvite precipitate.

16 Claims, 2 Drawing Sheets

(56) References Cited

OTHER PUBLICATIONS

Holt et al., The future for electrocoagulation as a localised water treatment technology, Chemosphere 59 (2005) 355-367.

Ohlinger et al., Kinetics and thermodynamics of struvite crystallization as it applies to phosphate recovery from municipal wastewater for agricultural fertilizer production.

Robinson., Electroflocculation in the treatment of polluted water, Australian water & Wastewater Association, Joint NSW and Victoria State Conference in Wodonga, Nov. 22-24, 1999 (www.electropure.com.au/paper.htm).

Vik et al., Electrocoagulation of potable water, Water Research, vol. 18, issue 11, 1984, pp. 1355-1360.

Yousuf et al., Electrocoagulation (EC)—science and applications, Journal of Hazardous Material B84 (2001) 29-41.

* cited by examiner

METHOD FOR SIMULTANEOUS ELIMINATION OF ORTHOPHOSPHATE AND AMMONIUM USING ELECTROLYTIC PROCESS

FIELD OF THE INVENTION

This invention relates to a method for the simultaneous elimination of orthophospate and ammonium ($NH_4^+$) from a nitrogen-rich effluent using an electrolytic process and thereby electro-synthesis of struvite.

BACKGROUND OF THE INVENTION

Electrocoagulation was already proposed in the late 19th and early 20th century. The use of electrocoagulation with aluminum and iron was patented in 1909 in the United States (Robinson, Australian Water & Wastewater Association, Joint NSW and Victoria State Conference in Wodonga, 22-24 Nov. 1999 (www.electropure.com.au/paper.htm); Vik et al. Water-Research, volume 18, Issue 1, 1984, pages 1355-1360).

Coagulation is essentially to neutralize, or reduce, the electric charge of colloids and hence promote the aggregation of colloidal particles. To destabilize a suspension it is necessary that the attractive forces between particles are greater than the repulsive forces thereof. Attractive forces are mainly van der Weals forces, which act at a short distance thereof. In general, the total energy that controls the stability of the energy dispersion comprises attractive van der Weals energy of repulsion at short distance, the electrostatic energy and energy due to the steric effect of molecules solvent.

Coagulation can be done by chemical or electrical means. Alun, lime and/or polymers have been used as chemical coagulants. Chemical coagulation is becoming less popular today because of high costs associated with the chemical treatments of a significant volume of sludge and hazardous heavy metals such as metal hydroxides generated thereof in addition to the cost of chemical products needed for coagulation itself. Chemical coagulation has been used for decades.

Although the electrocoagulation mechanism resembles chemical coagulation, although, some differences benefit electrocoagulation. Indeed, electrocoagulated flocs differ from those generated by chemical coagulation. Flocs created with the electrocoagulation process tend to contain less bound water, are more resistant to shearing and are more easily filterable.

Flocs are created during the electrocoagulation water treatment with oxydo-reduction reactions. Currents of ions and charged particles, created by the electric field, increase the probability of collisions between ions and particles of opposite signs that migrate in opposite directions. This phenomenon allows the aggregation of suspended solids to form flocs.

The electrolytic reactions that take place at the electrodes are accompanied by production of micro bubbles of hydrogen (at the cathode) and oxygen (at the anode). These micro bubbles heading up will result in an upward movement of the flocs formed thereof that are recovered at the surface (this mechanism is named flotation).

The complexity of the mechanisms involved in the process of electrocoagulation in the treatment of water is not well scientifically elucidated (Yousuf et al., Journal of Hazardous Material B84, 2001). There are various features of the mechanism of the process and the geometry, or design, of the reactor in the literature. The different physico-chemical treatment, the shape of the reactor and the shape and size of electrodes affect the performance of the treatment. The wide variety of processing parameters reported in the literature and the lack of scientific data for efficient model processing and optimal processing conditions translate into a lack of development in this field. At this time, electrocoagulation is still problematic and therefore not popular (Holt et al., Colloids and Surfaces A: Physicochem. Eng. Aspects 211 (2002); Holt et al., Chemosphere 59(2005) 355-367).

The existence of an electric current in a body of water implicitly requires Faraday reactions surrounding the electrodes. The formation of chemical gradients depends on the electrolytic magnitude. The consequences of chemical reactions become more pronounced and significant in the prolonged application of electrokinetic. The effects include electrolytic of water with the simultaneous development of pH gradients and the transfer of electrolytic dissolution of the anode producing metal ions ($Fe^{3+}$, $Al^{3+}$, $Mg^{2+}$, etc.) or cations of the electrolyte from the anode to the cathode. Chemical reactions can, in ion exchange or precipitation, form new mineral phases for cleaning water for instance.

At the cathode, the main reaction is:

$$4H_2O + 4e^- \rightarrow 2H_2 + 4OH^- \qquad \text{(Equation 1)}$$

The increase in hydroxyl ions can increase the precipitation of metal hydroxide. The pH of the cathode's region is basic. The following equations describe the chemical reactions at the anode:

$$2H_2O \rightarrow O_2 + 4H^+ + 4e^- \qquad \text{(Equation 2)}$$

If the anode is made of magnesium:

$$Mg \rightarrow Mg^{2+} + 2e^- \qquad \text{(Equation 3)}$$

It is noted that twice as many water molecules are electrolysed at the cathode compared to the anode for the same quantity of electricity.

The struvite is a compound with a little solubility and used as a fertilizer in agricultural fields. This compound is of the formula $NH_4MgPO_4, 6H_2O$ and comprised $PO_4^{3-}$ and $NH_4^+$ ions, both essential to plants growth. Struvite is known as a fertilizer and have been proved potent in soils having a pH between 5.5 and 6.5.

Precipitation of struvite in a wastewater allows the elimination of the ortho-phosphate, $NH^{4+}$ and magnesium present in the wastewater. Currently, processes for precipitating struvite use fluidized beds, or contained tanks reactors. In Japan, the precipitation of struvite has been tested in a sludge treatment reactor. To obtain a good performance, it is essential to optimized both nucleation and precipitation by optimizing the treatment time in the reactor and the nature of the support particles for the precipitation.

Precipitation of struvite is controlled by the pH, the supersaturation, the temperature and the presence of impurities such as calcium and can occur when the concentration in magnesium, ammonium and phosphore ions exceed the solubility product of the complex as per the following expression:

$$Ksp = [Mg^{2+}][NH_4^+][PO_4^{3-}] \quad pKs = 13.26$$

The presence of organic matter impact on the nucleation and growth of struvite crystals and reduce the precipitation rate. In a wastewater to be treated, $NH^{4+}$ and $PO_4^{3-}$ are among the components to be eliminated. While adding $Mg^{2+}$ in the solution with a basic pH, the precipitate is formed. Several conditions are required for the reaction to occur:

a phosphorous concentration higher than 50 ppm
a pH value between 7 and 11, preferably between 8 and 9.2
a molar ratio Mg/P of 0.9 to 1.5 a strong agitation a simultaneous increase in pH and temperature to reduce time of precipitation

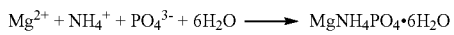

$$Mg^{2+} + NH_4^+ + PO_4^{3-} + 6H_2O \longrightarrow MgNH_4PO_4 \cdot 6H_2O$$

Many patent applications have been filed for the synthesis of the struvite. WO 01/19735 discloses a process for the treatment of manure. WO 95/05347 discloses an electrolytic system using a series of electrodes. WO 2007/009749 discloses a reactor and a method for the production of struvite. U.S. Pat. No. 4,389,317 discloses the chemical reduction of phosphates in water. WO 00/56139 discloses a method for preventing the formation of struvite in fish cans.

WO 2009/102142 discloses a two-steps treatment of an effluent, wherein the effluent is first treatment in an anaerobic reactor followed by a second treatment producing the struvite.

Therefore, there exists a need in the art for an improved method, system and apparatus for optimizing the production of struvite by an electrolytic treatment of a waste effluent over the existing art. There is a need in the art for such a method, system and apparatus for treating an effluent that can be easily installed, economically manufactured and operated. And there is a very perceptible need for an improved method, system and apparatus for treating wastewater over the existing art.

SUMMARY OF THE INVENTION

The present invention alleviates one or more of the drawbacks of the background art by addressing one or more of the existing needs in the art.

Accordingly, the present invention provides for a method for the treatment of nitrogen-rich effluent and production of struvite comprising the steps of introducing the effluent in an electrolytic system comprising a first electrolytic reactor having at least one cathode and at least one anode adapted to perform electrolytic treatment of the effluent in the first electrolytic reactor; and a second electrolytic reactor comprising at least one cathode and at least one magnesium anode adapted to perform electrolytic of the effluent in the second electrolytic reactor; performing a first electrolytic treatment to the effluent in the first electrolytic reactor, thereby eliminating organic matter that impact on nucleation of struvite; and performing a second electrolytic treatment to the effluent in the second electrolytic reactor, thereby injecting Mg ions which react with ammonium and orthophosphates from the effluent to form a struvite precipitate.

In one embodiment of the present invention, the method further comprises a conditioning step prior to the first electrolytic treatment, the conditioning step comprising adjusting the stoechiometric ratio of orthophosphate in the effluent and determining, based on initial concentration of $NH_4^+$, orthophosphate and calcium comprised in the effluent, the current intensity and treatment time needed to be applied.

In one embodiment of the present invention, the method further comprises a conditioning step prior to the second electrolytic treatment, the conditioning step comprising adjusting stoechiometric ratio of orthophosphate in the effluent and determining, based on initial concentration of $NH_4^+$, orthophosphate and calcium comprised in the effluent, the current intensity and treatment time needed to be applied.

The present invention provides for a method wherein at least one anode of the first electrolytic reactor is made of a material selected from the group consisting of magnesium, aluminium, iron and an other inert material.

In one embodiment of the present invention, at least one anode of at least one of the first and second electrolytic reactor is tubular. Preferably, at least one of the first and second electrolytic reactors comprise 9 tubular anodes disposed circularly and parallel to the central axis of the reactor.

In an alternative embodiment of the present invention, at least one of said first and second electrolytic reactors comprises one cylindrical anode disposed along the central axis of the reactor.

The present invention provides for a method wherein the at least one cathode of the first and second electrolytic reactors consists in a central cathode or a peripheral cathode. In one embodiment of the present invention, at least one of the first and second electrolytic reactors comprise both a central and a peripheral cathode. It is provided that the cathodes used in the present invention are made of a material selected from the group consisting of stainless, galvanized steel and a material having a potential close to the one of the material of anodes. It is also provided that the cathode can be of the same material as the anode provided that in the second electrolytic reactor the cathode and anode are made of magnesium.

The present invention provides for a method wherein the effluent is treated at a pH between 7.0 and 9.5, preferably between 8.0 and 9.5 and most preferably at a pH of 9.2.

In a preferred embodiment of the present invention, the amount of orthophosphate in the effluent is adjusted to be about five time the amount of $NH_4^+$.

In a preferred embodiment of the present invention, the concentration of orthophosphate in the effluent is adjusted to be between 50 and 300 ppm.

In a preferred embodiment of the present invention, the effluent is agitated while being treated in the electrolytic reactors.

In a preferred embodiment of the present invention, the second electrolytic treatment generates $Mg^{2+}$ ions in a quantity such to obtain a molar ratio Mg/P between 0.9 and 1.5.

In a preferred embodiment of the present invention, the electrical current intensity used in the electrolytic treatments is between 1 and 120 A.

The present invention is suitable for any nitrogen-rich effluent, but most particularly for wastewater from industrial source, wastewater from agricultural source and manure.

In the present invention, the electrolytic treatment used can be electrocoagulation, electrofloatation or a combination of both.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which form a part of this original disclosure.

DETAILED DESCRIPTION OF PREFERRED EMBODIMENTS

A preferred embodiment of the present invention is described bellow with reference to the drawings.

Figure 1:
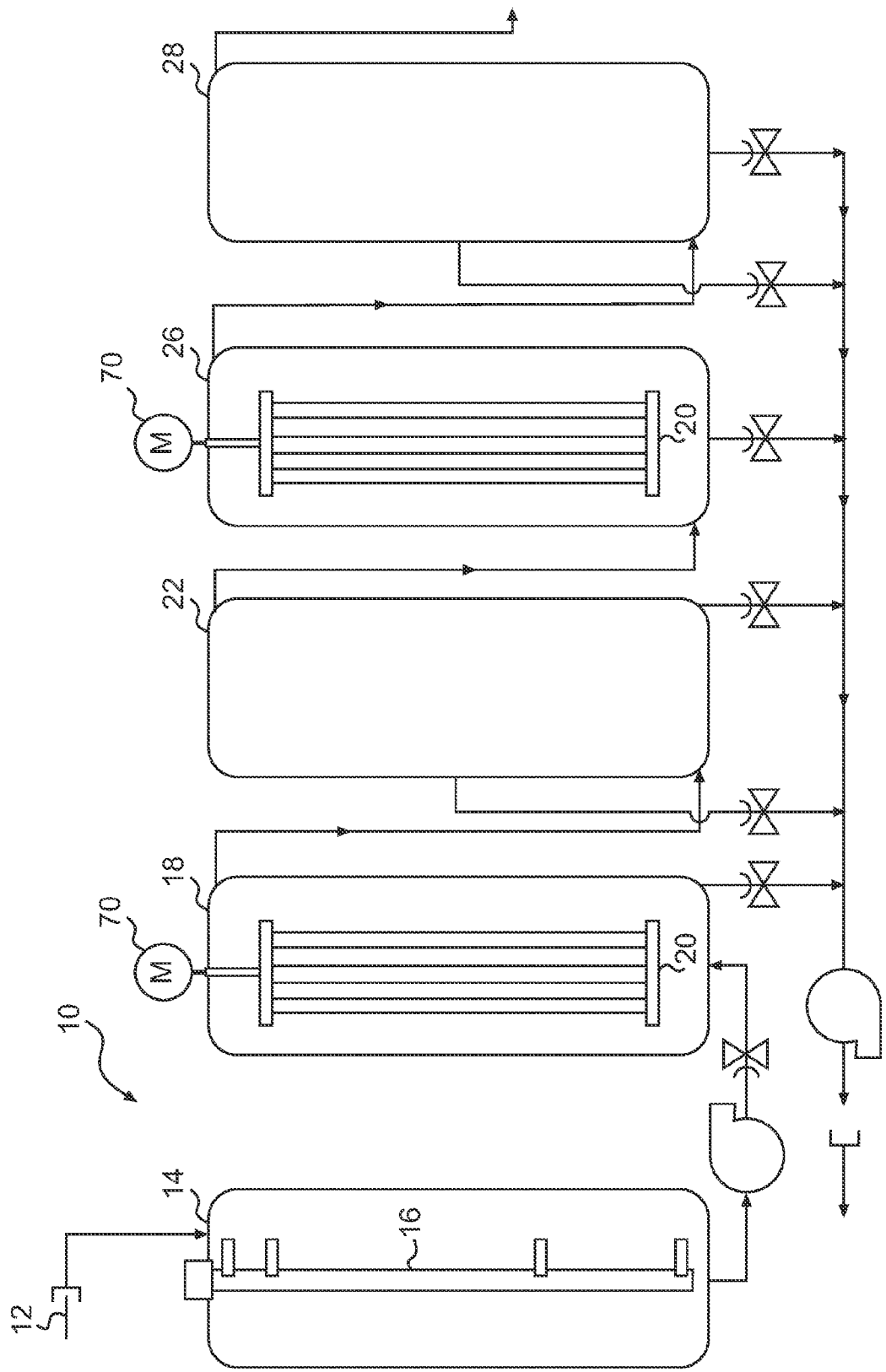
FIG. 1 is a schematic illustration of the electrolytic system with at least one embodiment of the invention.

The electrolytic system 10, as illustrated in FIG. 1, comprises a prefilter 12 that retains particles and allows the colloidal fraction to access a conditioning tank 14. In the conditioning tank 14, there is a level captor 16 measuring and controlling the level of fluid in the tanks. Also, they are sensors (not shown in FIG. 1) that allow for the measurement of conductivity, pH, initial concentrations in $NH_4^+$, calcium and orthophosphates as well as initial organic content. Those measured values allow the continuous evaluation of the conductivity of the affluent, its pH and allows the adjustment of the quantity of orthophosphate in solution with respect to the $NH_4^+$ concentration in order to respect the stoechiometry of the reaction desired. Conductivity and pH probes are well known in the art and are easily available. The measure of $NH_4^+$ can be made, for example, with a ISE WTW probe coupled with a VARION® PLUS 700IQ sensor. Phosphate analysis can be made using colorimetric devices such as PHOS200 and TOPHO. The organic charge can be evaluated using a CSS70 sensor. Also, UV sensors allow for the measurement of absorbance at 254 nm, which can be easily correlated with the chemical demand in oxygen.

The measurement of the $NH_4^+$ concentration in solution also allows for the determination of the Mg concentration needed to precipitate the struvite. The second law of Faraday is used to convert the Mg concentration into current intensity and treatment time in order to maximized the production of struvite.

Once conditioned, the effluent is pumped in a first electrolytic reactor 18 comprising a fixed electrocoagulation module 20. For the purpose of the present invention, the electrocoagulation could be interchanged with an electrofloatation module. The first electrolytic treatment reduce of about 85% the organic charge of the effluent and the treated effluent is brought in a first decantor 22 to separate the solid-liquid fractions. An automatic dosing device (not shown in FIG. 1) is placed between the exit of the first decantor 22 and the entry of a second electrolytic reactor 26. This automatic dosing device allows the adjustment of the quantity of orthophosphate in the effluent needed to react with all the $NH_4^+$ in solution. After this second conditioning step, the effluent is introduced in a second electrolytic reactor 26, which also comprises a fixed electrocoagulation module 20. The second electrolytic reactor 26 comprises in its fixed electrocoagulation module 20 at least one soluble anode made of magnesium. The ions $Mg^{2+}$ generated while applying the electrical current react with the $NH_4^+$ and orthophosphate in solution and therefore produce a struvite precipitate. Both first and second electrolytic reactors 18 and 26 optionally comprises a motor 70 allowing the rotation of the electrocoagulation module 20, providing for an additional agitation of the fluid in the reactors 18 and 26.

After this second electrolytic treatment, the effluent is brought in a second decantor 28 for isolating the struvite precipitate.

Figure 2:
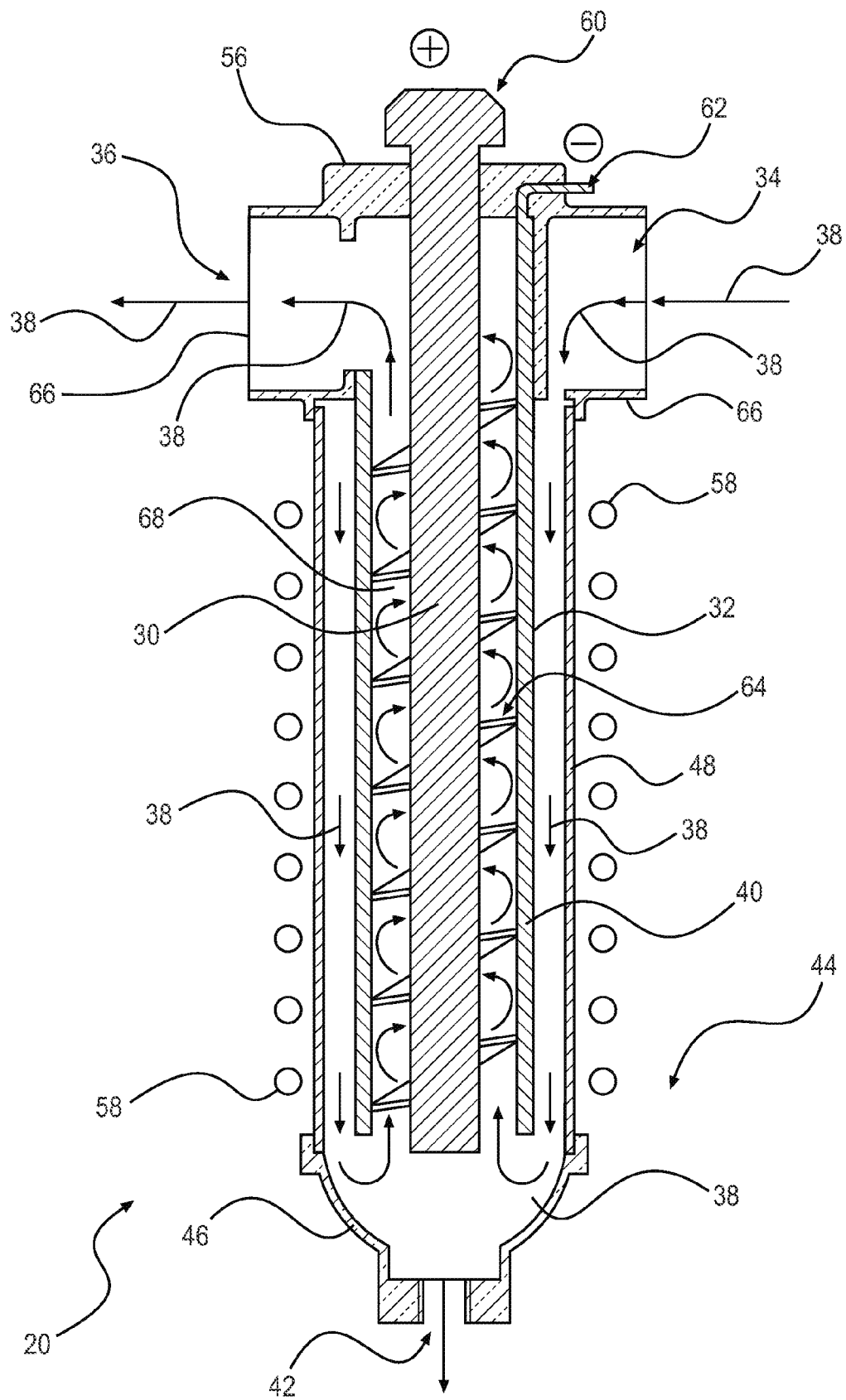
FIG. 2 is a schematic illustration of a modular electrolytic apparatus in accordance with at least one embodiment of the invention.

An exemplary electrocoagulation module 20 is illustrated in FIG. 2 with a section view allowing a better view of its construction. The electrocoagulation module 20 comprises an anode module 30 and a cathode module 32 adapted to interact in an electrolytic process producing electrocoagulation. The electrocoagulation module 20 of the present embodiment includes an inlet 34 and an outlet 36 configured to respectively receive and extract the fluid to and from the electrocoagulation module 20. The fluid, once introduced in the electrocoagulation module 20, follows a path or a fluidic circuit configured to put the fluid in communication with the electrolytic process that is produced in the electrocoagulation module 20. In the present example, the fluid follows a path identified by a series of arrows 38 defined by internal walls 40. A pump, which is not illustrated in FIG. 1, pushes the fluid through the electrocoagulation module 20. An opening 42 disposed on a bottom portion 44 of the electrocoagulation module 20 is normally closed with a plug (not illustrated) to prevent the fluid to exit the electrocoagulation module 20. The opening 42 can be opened to remove the fluid from the electrocoagulation module 20 to purge the electrocoagulation module 20 for maintenance purposes, for instance. The electrocoagulation module 20 can also be purged to remove particles and debris. A larger closure member 46 is used to close the bottom portion of the electrocoagulation module 20 lower body 48. The closure member 46 can be optionally removed to provide a larger access in the electrocoagulation module 20. The lower body 48 can threadedly engage the upper body 56 and be removed from the upper body 56, if desirable.

Still referring to FIG. 2, the closure member 46 is located at the lower portion of the electrocoagulation module 20 to receive particles therein. The cathode module 32 is bottomless and allows the particles to drop in the closure member 46 acting as a particles-receiving member 46. The removable particles-receiving member 46 is preferably disposed in the center of the cathode module 32 as illustrated in the present embodiment and is used for removing decanted particles from the cathode module 32. The opening 42 in the closure member 46 can alternatively be used to inject gas, like air, or liquids for further conditioning the liquid in the electrocoagulation module 20 and/or influence the electrocoagulation process inside the cathode module 32.

The electrocoagulation module 20 further includes body portions 48, 56 that can optionally include insulating material to prevent heat transfer with the environment. Conversely, the electrocoagulation module 20 might be equipped with heating/cooling elements 58 to keep the electrocoagulation apparatus 20 at a predetermined operating temperature. The upper body 56 of an embodiment can be made of an insulating material preventing heat transfer between the inside of the electrocoagulation module 20 and the outside of the electrocoagulation module 20. The lower body 48 of the embodiment illustrated in FIG. 2 is made of a material that is less insulating the electrocoagulation module 20. Heating or cooling elements 58 are disposed, for example, in a spiral around the lower body 48 to either heat or cool the lower body 48. The heating or cooling elements 58 can use a fluid circulating in a tubular system or electric elements in contact with, or nearby, the lower body 48. Another embodiment is using the upper body 56 to transfer heat to/from the electrocoagulation module 20 in cooperation or not with the lower body 48.

Still referring to the embodiment of FIG. 2, the anode module 30 is secured to the upper body 56 and extends above the upper body 56 to allow electrical connection 62 thereto.

The cathode module 32 of the present embodiment is also secured to the upper body 56 and extends therefrom 60 to allow electrical connection thereto. A power supply (not illustrated) is connected to the cathode module 32 to provide negative power thereof. Electrical polarity reversal is provided when desired to avoid passivation of the anode module 30 and the anodes 68 secured thereon. Insulators may be placed between two adjacent electrodes to prevent short circuits thereof. The cathode 32 and the anodes 68 are subjected to DC current. One skilled in the art can also appreciate that the upper body 56 is made of an insulating material to prevent establishing an electrical connection between the cathode 32 and the anode module 30.

The anode module 30 can be made of soluble or inert materials. The cathode module 32 can be made of steel, aluminium, stainless steel, galvanized steel, brass or other materials that can be of the same nature as the anode module 30 material or having an electrolytic potential close to the electrolytic potential of the anode 68. The cathode module 32 of the present embodiment has a hollowed cylindrical shape, fabricated of sheet material, and can be equipped with an optional lower frustoconical portion (not illustrated in FIG. 2). The inter electrode distance of an embodiment of the invention is about between 8-25 mm and preferably 10 mm for electro floatation and 20 mm for electrocoagulation. The interior of the cathode module 32 electrically interacts with the outside of the anode module 30. The electrocoagulation module 20 internal wall includes non-conductive material, like polymer, in an embodiment of the invention. The cathode module 32 could alternatively serve as a reservoir, or reactor, at the same time thus holding the liquid to treat therein in other embodiments. The cathode module 32 can be made of a material different from the anode material 30 or can alternatively be made of the same material, like, for instance, magnesium.

The size and the available active surface area of the cathode module 32 can be adapted to various conditions without departing from the scope of the present invention. The surface ration of the cathode/anode can be identical or vary to about 1.5. The cathode module 32 of other embodiments can alternatively be oval or conical; its diameter expending upward or downward. The electrocoagulation module 20 can include therein an optional fluid agitator module 64 adapted to apply kinetic energy to the fluid contained in the electrocoagulation module 20 by moving or vibrating the fluid in the electrocoagulation module 20 as it is illustrated in the embodiment depicted in FIG. 2.

As mentioned above, the movement of the fluid increases the kinetic energy contained therein to destabilize the colloidal solution. This can be achieved by turbulently injecting the fluid in the electrolytic module (the speed and tangential injection of the fluid are possible ways to create turbulences in the fluid). The fluid agitator module 64 in this embodiment is a spiral shaped protrusion member 64 that is secured to the anode module 30. The movement of the fluid between the anode module 30 and the cathode module 32 is intensified by the protrusion member 64, which influences the electrolytic process. The anode module 30 of an alternate embodiment that is not illustrated in FIG. 2 could be rotatably secured to the upper body 56 of the electrocoagulation module 20 and be rotated by an external motor to rotate the anode and the protrusion members secured thereon to apply additional kinetic energy to the fluid as it will be discussed below. As it is illustrated in FIG. 2, the anode module 30 is preferably centered inside the electrocoagulation module 20 and preferably located at equal distance from the cathode module 32.

The electrocoagulation module 20 of FIG. 2 further comprises a pair of electrocoagulation module connectors 66 adapted to operatively install the electrocoagulation module 20 in a larger fluid treatment process if desired. The electrocoagulation module 20 can removably be mounted in series, or in parallel, in the fluid treatment process. This way, the electrocoagulation module 20 can easily be added, maintained, replaced and/or removed from the fluid treatment process.

Example 1

An effluent from the agri-food industry has been treated using the method and process of the present invention. This effluent was providing from a pork transformation plant and was charged in urine, feces and blood with a pH of 6.8. The effluent has been treated with the process of the present invention using a 2 reactors and decantors process, with a variable tension generator (0-30V) offering current between 1 and 120 A. The anodes of the reactors were in magnesium and the measures of the chemical oxygen demand, orthophosphate concentration, $NH_4^+$ concentration, calcium concentration and magnesium concentration made using HACH chemicals.

TABLE 1

| Analysis | | | | |
|---|---|---|---|---|
| Sample | Brut effluent | Conditioned effluent | Treated sample | Treated sample |
| Time | 10:00 am | 11:00 am | 1:30 pm | 2:30 pm |
| Temperature (C.) | 28 | 28 | 43 | 43 |
| pH | 7.02 | 1.02 | 9.03 | 8.85 |
| M.E.S (mg/l) | 1700 | 1900 | 0 | 8.85 |
| Turbidity (NTU) | 817 | 1100 | 2 | 9 |
| $PO_4^{3-}$ (mg/l) | 43 | 135 | 0.4 | 0.4 |
| $NH_4^+$ (mg/l) | 55 | 55 | 26 | 13 |

It is shown in Table 1 that the brut effluent has an initial concentration of orthophosphate of 43 ppm and ammonium concentration of 55 ppm. To eliminate these two elements, the stoechiometric ratio has to be respected. An initial concentration in orthophosphates of 55×5=275 ppm should have been needed according to the initial data. However, the effluent has been conditioned to have an orthophosphate concentration of 135 ppm, which allowed a reduction in $NH_4^+$ of 135:5=27 ppm corresponding to the results obtained (26 ppm). This example shows the importance of respecting the stoechiometric ratio to allow an optimal reduction of $NH_4^+$ as well as maintaining a pH of about 9.2.

TABLE 2

| | $NH_4^+$ (mg/l) initial 1 | $PO_4^{3-}$ (mg/l) initial 2 | $PO_4^{3-}$ (mg/l) theory 3 | $PO_4^{3-}$ (mg/l) added 4 | $PO_4^{3-}$ (mg/l) final 5 | $NH_4^+$ final 6 | $NH_4^+$ elimination (%) |
|---|---|---|---|---|---|---|---|
| 9:00 am | 68 | 57 | 340 | 0 | 0 | 55 | 19 |
| 12:30 pm | 70 | 73 | 350 | 174 | 0 | 28 | 60 |
| 1:30 pm | 55 | 43 | 275 | 152 | 0.4 | 26 | 52 |
| 2:30 pm | 55 | 43 | 275 | 230 | 0.4 | 13 | 77 |
| 3:00 pm | 50 | 51 | 250 | 235 | 0 | 7 | 86 |

Table 2 illustrates that the ions ortho phosphate are needed to eliminate $NH_4^+$ and that the closer the ratio orthophosphate/$NH_4^+$ is closer to 5:1, the better is the $NH_4^+$ elimination.

Example 2

A lixiviat has been treated using the method and process of the present invention. The effluent has been treated with the process of the present invention using a 2 reactors and decantors process, with a variable tension generator (0-30V) offering current between 1 and 120 A. The anodes of the reactors were in magnesium and the measures of the chemical oxygen demand, orthophosphate concentration, $NH_4^+$ concentration, calcium concentration and magnesium concentration made using HACH chemicals.

The effluent was treated with a tension of 27.3V and a current of 100 A.

TABLE 3

| | Analysis | | |
|---|---|---|---|
| Sample | Brut lixiviat | Conditioned lixiviat | Treated lixiviat |
| Temperature | 0 | 0 | 27 |
| pH | 7.19 | 3.75 | 9.09 |
| M.E.S (mg/l) | 234 | 352 | 27 |
| Turbidity (NTU) | 276 | 390 | 45 |
| $PO_4^{3-}$ (mg/l) | 29 | 225 | 0.5 |
| $NH_4^+$ (mg/l) | 190 | 190 | 140 |

In this example, it is demonstrated again that the reduction of the $NH_4^+$ is in accordance with the stoechiometric ratio. To eliminate the residual $NH_4^+$, an total amount of 950 ppm of orthophosphate should have been in the conditioned lixiviat.

Example 3

An combined effluent from landfill sites has been treated using the method and process of the present invention. The effluent has been treated with the process of the present invention using a 2 reactors and decantors process, with a variable tension generator (0-30V) offering current between 1 and 120 A. The anodes of the reactors were in magnesium and the measures of the chemical oxygen demand, orthophosphate concentration, $NH_4^+$ concentration, calcium concentration and magnesium concentration made using HACH chemicals. Several batches (A-H) of the initial effluent have been treated and the results are shown in Table 4.

TABLE 4

| Sample | Time | T(C) | pH | Conductivity (mS/cm) | MES (mg/l) | $PO_4^{3-}$ (mg/l) | $NH_4^+$ (mg/l) |
|---|---|---|---|---|---|---|---|
| initial | 0 min | 22 | 7.84 | 5.94 | 1140 | 90 | 310 |
| A | 5 min | 42 | 8.82 | 3.90 | 24 | 6.2 | 220 |
| B | 4 min | 42 | 8.77 | 3.98 | 39 | 7.4 | 280 |
| C | 5 min | 43 | 8.66 | 3.74 | 21 | 4.3 | 120 |
| D | 4 min | 42 | 8.58 | 3.84 | 29 | 6.2 | 280 |
| E | 5 min | 43 | 8.63 | 3.75 | 20 | 5.4 | 270 |
| F | 4 min | 42 | 8.62 | 3.95 | 22 | 4.8 | 290 |
| G | 5 min | 43 | 8.56 | 3.60 | 18 | 8.6 | 290 |
| H | 4 min | 41 | 8.51 | 3.72 | 25 | 10.6 | 150 |

The results shown in Table 4 demonstrate that both the stoechiometric ratio and the time of treatment need to be sufficient for allowing a satisfactory elimination of $NH_4^+$. If the stoechiometric ratio is not respected, the complete, or at least satisfactory elimination of $NH_4^+$ is impossible. Also, the treatment needs to be performed for a time sufficient to allow the production of a minimal quantity of $Mg^{2+}$ ions, otherwise the reaction cannot be optimal.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. A method for simultaneous elimination of orthophosphate and ammonium from an effluent and enabling the production of struvite, wherein the effluent is a wastewater from industrial source, a wastewater from agricultural source or manure, the method comprising the steps of:
    performing a first electrolytic treatment to said effluent in a first electrolytic reactor, the first electrolytic reactor comprising at least one cathode and at least one anode and being adapted to perform the first electrolytic treatment, thereby eliminating organic matter and calcium present in the effluent that impact on nucleation of struvite;
    separating a solid fraction from the effluent,
    performing a second electrolytic treatment to said effluent in a second electrolytic reactor, the second electrolytic reactor comprising at least one cathode and at least one magnesium anode and being adapted to perform the second electrolytic treatment, for producing $Mg^{2+}$ ions which react with $NH_4^+$ and orthophosphates from said effluent to form a struvite precipitate; and eliminating the struvite precipitate from the effluent.

2. The method of claim 1, further comprising a conditioning step prior to performing said second electrolytic treatment, said conditioning step comprising adjusting stoichiometric ratio of orthophosphate in said effluent and determining, based on initial concentration of $NH_4^+$, orthophosphate and calcium comprised in said effluent, current intensity and treatment time needed to be applied.

3. The method of claim 1, wherein said at least one anode of said first electrolytic reactor is made of a material selected from the group consisting of magnesium, aluminium, iron and another inert material.

4. The method of claim 1, wherein said at least one anode of at least one of said first and second electrolytic reactor is tubular.

5. The method of claim 1, wherein at least one of said first and second electrolytic reactors comprises one cylindrical anode disposed along the central axis of said reactor.

6. The method of claim 1, wherein said at least one cathode of said first and second electrolytic reactors consists in a central cathode, a peripheral cathode or a combination of both.

7. The method of claim 1, wherein said at least one cathode of said first and second electrolytic reactors is made of a material selected from the group consisting of stainless, galvanized steel and a material having a potential close to the one of the material of said at least one anode.

8. The method of claim 1, wherein said effluent is treated at a pH between 7.0 and 9.5.

9. The method of claim 2, wherein the amount of orthophosphate in said effluent is adjusted to be about five time of the amount of $NH_4^+$.

10. The method of claim 2, wherein the concentration of orthophosphate in said effluent is adjusted to be between 50 and 950 ppm.

11. The method of claim 1, wherein the effluent is agitated while being treated in said first and second electrolytic reactors.

12. The method of claim 1, wherein said first electrolytic treatments is selected from the group consisting of electrocoagulation, electroflotation and a combination thereof.

13. The method of claim 1, wherein during said second electrolytic treatment a molar ratio Mg/P is maintained between 0.9 and 1.5.

14. The method of claim 1, wherein said first and second electrolytic treatment are performed using an electrical current intensity between 1 and 120 A.

15. The method of claim 2, wherein said stoichiometric ratio of orthophosphate in said effluent is calculated in accordance with the following formula:

$$Ksp=[Mg^{2+}][NH^{4+}][PO_4^{3+}]pKs=13.26.$$

16. The method of claim 1, wherein said second electrolytic treatment is electrocoagulation.

\* \* \* \* \*